United States Patent [19]

Wicht et al.

[11] 3,816,363

[45] June 11, 1974

[54] SAPONIFICATION RESISTANT, AQUEOUS SYNTHETIC RESIN DISPERSION

[75] Inventors: Paul Wicht, Fribourg; Kurt Volken, Basel, both of Switzerland

[73] Assignee: Lanza Ltd., Gampel (Canton of Valais), Switzerland

[22] Filed: May 28, 1971

[21] Appl. No.: 148,235

Related U.S. Application Data

[63] Continuation of Ser. No. 732,035, May 27, 1968, abandoned.

[52] U.S. Cl. ......... 260/17 A, 260/17 R, 260/23 EM, 260/23 XA, 260/29.6 WA, 260/29.6 TA
[51] Int. Cl. ............................................. C08f 29/24
[58] Field of Search..... 260/29.6 T, 80.81, 29.6 TA, 260/17 A, 17 R, 23 EM, 23 XA, 29.6 WA

[56] References Cited
UNITED STATES PATENTS

| 2,703,794 | 3/1955 | Roedel | 260/87.3 |
|---|---|---|---|
| 3,251,810 | 5/1966 | Buning | 260/78.5 |
| 3,423,352 | 1/1969 | Levine | 260/29.6 |
| 3,423,353 | 1/1969 | Levine | 260/29.6 |
| 3,632,542 | 1/1972 | Fox et al. | 260/29.6 T |
| 3,651,001 | 3/1972 | Meckbach et al. | 260/29.6 TA |
| 3,660,332 | 5/1972 | Kamio et al. | 260/29.6 T |

*Primary Examiner*—Lorenzo B. Hayes
*Attorney, Agent, or Firm*—Fisher, Christen & Sabol

[57] ABSTRACT

A binder composition containing, in aqueous dispersion, a terpolymer comprising a vinyl ester, vinyl chloride and ethylene in which the weight ratio of vinyl chloride to ethylene is from 1:2 to 3:1. The composition is prepared by emulsion polymerization of the terpolymer components.

12 Claims, No Drawings

SAPONIFICATION RESISTANT, AQUEOUS SYNTHETIC RESIN DISPERSION

This application is a continuation of application Ser. No. 732,035, filed May 27, 1968, now abandoned.

The invention is concerned with saponification resistant, aqueous synthetic dispersions with a high capacity for binding, to be used as binders for pigments and fillers and as an additional binder for mortar.

It has been known to use aqueous synthetic resin dispersions as a binder for coatings and plaster and as an addition to mortar. Coatings produced with such dispersions as binders have a good adhesiveness in a dry atmosphere, so that they are used above all as indoor coatings. They were not well suited for use as outdoor coatings which are exposed to the moisture of the atmosphere. As an addition to cement mortar, such dispersions improve the physical properties of the set concrete, for example, the flexure strength, resistance to impact, abrasion resistance and adhesiveness, as long as the concrete remains dry.

Aqueous synthetic resin dispersions made from polyvinyl ester, for example polyvinyl acetate, have the disadvantage, for these purposes, of being sensitive to alkali. Both the dispersions themselves and films formed from them are relatively easily saponified through the effect of alkalis and water. For that reason the improvements achieved through addition of these dispersions to concrete and through the use of these dispersions as a binder in coatings are lost under the effect of water, for example in a humid atmosphere. Particularly, whenever such a coating has been applied to an alkaline base (for example, concrete), the binder (polyvinyl ester) contained in it will saponify in a humid atmosphere with the collaboration of the alkalis contained in the base. However, no improved adhesiveness will be achieved any longer with the saponified binder.

It has also been known that such dispersions on the base of copolymers, for example, vinyl acetate-vinyl laurate, vinyl ester-acryl ester, vinyl ester-ethylene and so forth, have a somewhat improved alkali resistance than have pure polyvinyl acetate dispersions. But these dispersions will not be satisfactory either as additions to concrete and as binders for coatings on concrete or on some alkali containing base, since they do not resist a frequent or prolonged and increased action of humidity but they will saponify, as a result of which the improvement of the adhesiveness or the adhesiveness of the concrete and of the coating on the base will again be more or less lost.

It has further been known to use terpolymer dispersions on the base of vinyl ester-vinyl chloride acrylate as an additive to concrete or as a binder for coatings for facings. However, these dispersions require a large portion of acrylates (25 – 50%) for the desired characteristics to be achieved.

It has now been found that saponification resistant, aqueous terpolymer dispersions, are exceedingly suitable for use as binders for pigments, fillers and mortar, said dispersions consisting of 5–40 weight per cent of vinyl chloride
40–80 weight per cent of a vinyl ester with one to 18 carbon atoms in the acid radical and
5–25 weight per cent of ethylene, whereby the weight ratio of vinyl chloride to ethylene amounts to 1:2 to 3:1, and which contain 2 to 4 percent by weight, related to the total quantity of the monomers, of a nonionogenic synthetic protective colloid and 0.5 – 2 weight per cent, related to the total quantity of the monomers of a nonionogenic emulsifier. The grain size of the main portion of the polymer particles lies preferably between $0.1 - 2\ \mu$.

The production of terpolymer dispersions is carried out in such a manner that water, protective colloid, polymerization accelerator and small pH buffer are applied, the pH value of the dispersion at 3.7 – 7 being applied cold, that ethylene is introduced and, while maintaining the ethylene pressure of 10 – 100 atmospheres, the vinyl ester together with vinyl chloride and the nonionogenic emulsifier are added in the measure of their use during the terpolymerization at increased temperature.

Secondary sodium phosphate in combination with Na bicarbonate is effectively used as a pH buffer.

The addition of emulsifier together with vinyl ester and vinyl chloride will cause the dispersion to have favorable rheological properties. The size and distribution of the particles in the dispersion is regular. Furthermore, no formation of agglomerate will occur.

In order to obtain dispersions with particularly favorable characteristics, the polymerization is carried out advantageously in the presence of 1 to 5 percent by weight, related to the total quantity of monomers, of a solvation agent. All known neutral plasticizers are applicable as solvation agents which have a high solvation capacity, such as dibutyl phthalate, citric acid ester, neutral phosphoric acid esters, glycolic ester, etc., as well as solvents such as methanol, glycols, etc.

As vinyl esters, preferably vinyl acetate and vinyl propionate are used.

Only water soluble, nonionogenic synthetic products, such as polyvinyl alcohol, hydroxyethylcellulose, hydroxymethylcellulose, poly-N-vinylpyrrolidone, etc., are to be considered as protective colloids. Preferably, polyvinyl alcohol and hydroxyethylcellulose are used.

As nonionogenic emulsifiers, for example, addition compounds of ethylene oxide, ethanolamines or sorbitol to fatty acids, tall oil, alkyl phenols, fatty acid amides, fatty alcohols and similar alcohols are to be considered. Preferably, a condensation product of ethylene oxide with nonyl phenol and block polymerizate of ethylene oxide/propylene oxide is used.

Water soluble catalyzers, forming radicals, ought to be considered as polymerization accelerators, for example, percompounds, such as peroxides, persulfate, but preferably alkali persulfate. The polymerization temperature is selected effectively between 60°–70°C.

For use as an additional binder in mortar and as a binder for pigments and fillers, synthetic resin dispersions or films made from them must have a number of characteristics. The dispersions themselves must be free of coagulate, electrolyte resistant and stable in storage, even in the case of low temperatures, for example up to about −10° to −20°C, furthermore they must be alkali resistant and they must have as low as possible a temperature for forming films. Obviously, the dispersions must be compatible with the hydraulic binder in case of their use as an addition to mortar (cement mortar, gypsum mortar, lime mortar). As a binder for pigments (coloring matter) and fillers (sand, asbestos), the binding capacity must be high.

The films produced from the dispersions must have a good tensile strength and a high tensile stretch, furthermore a good adhesiveness and resistance to wet abrasion of pigmented films or of masses made with filler.

EXAMPLE 1

In a double walled autoclave provided with a stirrer, a thermometer and a feed tank, made of stainless steel, which has a capacity of 1 liter, 570 g of softened water, 20 g of ethylene glycol, 12 g of hydroxyethylcellulose, 3 g of secondary sodium phosphate, 1.2 g of sodium bicarbonate and 3 g of potassium persulfate were introduced. The autoclave was closed and was flushed with nitrogen and subsequently with ethylene. Then, from the feed tank, which contained a mixture of 60 g vinyl chloride (VC), 540 g vinyl acetate (VA); 9 g of Pluronic L 62 (copolymer of propylene oxide/ethylene oxide with 20 percent ethylene and 6 g Tergitol NPX (condensation product on the base of ethylene oxide), about 60 ml of the mixture was introduced. After that, ethylene up to a pressure of 17 atü [metric] was impressed and heated to 68°–70°C. During this process, an increase in pressure to 20 atü could be observed. In the case of an ethylene pressure of 20 atü, the remainder of the mixture was brought in from the feed tank. After that, it was flushed out the air in order to remove the remaining monomers, the pH value was set to about 5 through addition of a 5 percent sodium bicarbonate solution and simultaneously 2 percent by weight, in relation to the solid substance, of dibutyl phthalate was introduced.

EXAMPLES 2 – 8

As in Example 1, additional modified terpolymer dispersions were made and tested. In the succeeding table the characteristics of the various terpolymer dispersions according to the invention have been recorded.

For the determination of alkali resistance, 100 g of the pertinent dispersion were mixed with 500 cm of a 2-n aqueous potassium lye and were stirred constantly in a closed vessel at 25°C. In that case then, the alkali concentration corresponds to that of a 1.5 n potassium lye. At different times, samples were taken and the consumption of KOH which had occurred was determined.

For the sake of comparison let us show that copolymer dispersions on the basis of vinyl acetate/ethylene with an ethylene content of 11 percent has a considerably worse alkali resistance. Thus, the consumption of KOH/g of solid substance after 24 hours was 128.8 and after 48 hours it was 231.

TABLE 1

| Examples | 1 | 2 | 3 | 4 | 5 | 6 | 7 | 8 |
|---|---|---|---|---|---|---|---|---|
| Vinyl acetate (percent) | 81.8 | 77.4 | 75.9 | 60.0 | 53.4 | | 48.7 | 40 |
| Vinyl chloride (percent) | 9.1 | 13.5 | 13.4 | 25.7 | 28.8 | 27.1 | 32.5 | 40 |
| Ethylene (percent) | 9.1 | 9.1 | 10.4 | 14.3 | 17.8 | 9.1 | 18.9 | 20 |
| Vinyl propionate (percent) | | | | | | 63.8 | | |
| Solvate: | | | | | | | | |
| Plasticizer | DBP | DBP | DBP | DBP | DBP | DBP | DBP | DBP |
| Solvent | G | M | G | M | M | M | M | M |
| Protective colloid | HC | PVA1 | HC | PVA1 | HC | HC | HC | HC |
| Emulsifier | AO | AO | AO | AO | AO | AO | AO | AO |
| pH value | 5 | 5 | 4.8 | 4.6 | 5.1 | 6.9 | 5.5 | 5.8 |
| Viscosity in poises UpM | 60 | 50 | 48 | 28 | 32 | 32 | 57 | 93 |
| Resistance to cold in °C | −20 | −10 | −10 | −10 | −10 | −10 | −10 | −10 |
| Size of particles in μ | 0.5–1.5 | 0.5–2 | 0.5–2 | 0.5–2 | 0.5–2 | 0.5–2 | 0.5–3 | 0.5–3 |
| Temperature in °C for the formation of film | 8–10 | 15 | 6 | 14 | 8 | 8 | 14 | 18 |
| Alkali resistance, consumption mg KOH/g solid substance after: | | | | | | | | |
| 28 hours | 65 | 36.9 | 73 | 30 | 27 | 12.9 | 32.8 | 26.3 |
| 48 hours | 112 | 67 | 110 | 52 | 43 | 26.5 | 49.2 | 33.8 |
| Tensile strength in kg/cm at 65 rel. atmospheric humidity [moisture], 20°C | 22 | 55 | 24 | 59.2 | 71 | 80 | 47.5 | 103 |
| Tensile stretch in percent at 65 rel. atmospheric humidity, 20°C | 560 | 485 | 775 | 676 | 1250 | 416 | 628 | 425 |

DBP=dibutyl phthalate  G=ethylene glycol  M=methanol  HC=hydroxyethylcellulose  PVA1=polyvinyl alcohol  AO=emulsifier on ethylene oxide base.

In comparison to this, copolymer dispersions on the basis of vinyl acetate/ethylene with 11 percent ethylene at a pigment/binder ratio of 2:1 rubbed through after 1,000 back-and-forth movements. When a pigment/binder ratio of 6:1 was chosen, the pigmented films were rubbed through at 300 back-and-forth movements.

In Table 3 a few values for flexure strength of mortar prisms containing a dispersion of synthetic substance are enumerated, whereby for the sake of comparison, a comparison dispersion on the basis of ethylene-vinyl acetate (11 percent ethylene) was also included. The values showed a superiority of the terpolymer dispersion particularly after 7 days storage in water.

TABLE 2.—RESISTANCE TO WET ABRASION, ACCORDING TO DR. OESTERLE, OF PIGMENTED DISPERSION FILMS PAINTED ONTO ETERNIT (A ROOF COVERING MADE OF ASBESTOS AND CEMENT)

(Test for the wet abrasion resistance was made by a back-and-forth movement of a brush on the surface of the film with a simultaneous sprinkling of a solution of 5% soft soap and 1% soda)

| Dispersion according to example | Relationship of pigment/binder | |
|---|---|---|
| 1 | 2:1 | Rub through after 3000 back-and-forth movements. |
|  | 4:1 | Rub through after 2400 back-and-forth movements. |
|  | 6:1 | Rub through after 1000 back-and-forth movements. |
| 2 | 2:1 | Still satisfactory after 5000 back-and-forth movements. |
|  | 4:1 | Still satisfactory after 5000 back-and-forth movements. |
|  | 6:1 | Rub through after 2500 back-and-forth movements. |
| 3 | 2:1 | Rub through after 4500 back-and-forth movements. |
|  | 4:1 | Rub through after 4500 back-and-forth movements. |
|  | 6:1 | Rub through after 2200 back-and-forth movements. |
| 4 | 2:1 | Still satisfactory after 5000 back-and-forth movements. |
|  | 4:1 | Rub through after 4500 back-and-forth movements. |
|  | 6:1 | Rub through after 2500 back-and-forth movements. |
| 5 | 2:1 | Still satisfactory after 5000 back-and-forth movements. |
|  | 4:1 | Rub through after 3500 back-and-forth movements. |
|  | 6:1 | Rub through after 1000 back-and-forth movements. |
| 6 | 2:1 | Still satisfactory after 5000 back-and-forth movements. |
|  | 4:1 | Still satisfactory after 5000 back-and-forth movements. |
|  | 6:1 | Still satisfactory after 5000 back-and-forth movements. |
| 7 | 2:1 | Still satisfactory after 5000 back-and-forth movements. |
|  | 4:1 | Rub through after 4000 back-and-forth movements. |
|  | 6:1 | Rub through after 1000 back-and-forth movements. |
| 8 | 2:1 | Still satisfactory after 5000 back-and-forth movements. |
|  | 4:1 | Still satisfactory after 5000 back-and-forth movements. |
|  | 6:1 | Rub through after 1800 back-and-forth movements. |

TABLE 3.—FLEXURE STRENGTH OF MOTAR PRISMS CONTAINING A DISPERSION OF A SYNTHETIC SUBSTANCE

Test: 1 Gwt of Portland cement and 3 Gwt of sand (grain size 0-5 mm) were mixed in the customary manner with water and a synthetic material dispersion into a mortar mixture and were worked up into prisms of 2 x 4 x 16 cm. The determination of the flexure strength was made after 28 days of storage in air as well as after 7 days of storage in water (the dispersion additive was obtained as an approximately 50% dispersion, for solid substances).

| | | Flexure strength in kg/cm² | |
|---|---|---|---|
| | Dispersion additive (percent) | Water/cement factor | 28 days dry storage 65 percent rel. atmospheric humidity | +7 days storage in water |
| Without dispersion additive | | 0.44 | 77 | 55 |
| Dispersion according to Example 1 | 5 | 0.36 | 123 | 82 |
| According to Example 2 | 5 | 0.38 | 128 | 79 |
| Comparative dispersion on the base of ethylene/vinyl acetate (11% ethylene glycol) | 5 | 0.45 | 79.9 | 52.9 |

What is claimed is:

1. In a binder for pigments, fillers and mortar, comprising an aqueous terpolymer dispersion containing:
   40 – 82 weight per cent of a vinyl ester having from one to 18 carbon atoms in the acid radical; and
   10 – 65 weight per cent of a mixture consisting of vinyl chloride and ethylene,
and also containing 2 – 4 weight per cent of a water soluble nonionogenic synthetic protective colloid selected from the group consisting of polyvinyl alcohol, hydroxyethylcellulose, hydroxymethylcellulose and poly-N-vinylpyrrolidone and 0.5 – 2 weight per cent of a water soluble non-ionogenic emulsifier selected from the group consisting of addition compounds of a member selected from the group consisting of ethylene oxide, ethanolamines and sorbitol with a member selected from the group consisting of fatty acids, tall oil, alkyl phenols, fatty acid amides and fatty alcohols, condensation products of ethylene oxide with nonyl phenol and block polymerizates of ethylene oxide and propylene oxide, both latter weight percentages based on the solids content of said dispersion, the improvement which comprises using a weight ratio of vinyl chloride to ethylene of from 1:2 to 3:1 whereby said binder exhibits a film formation temperature not exceeding 18°C in combination with high saponification resistance.

2. A binder according to claim 1 wherein said vinyl ester is vinyl acetate.

3. A binder according to claim 1 wherein said vinyl ester is vinyl propionate.

4. A binder according to claim 1 wherein said aqueous dispersion includes also 1 to 5 weight percent, based on the total quantity of the monomers, of a solvent selected from the group consisting of methanol and glycols.

5. A binder according to claim 1 wherein said aqueous dispersion includes also 1 to 5 weight percent, based on the total quantity of the monomers, of a neutral plasticizer selected from the group consisting of dibutyl phthalate, citric acid ester, neutral phosphoric acid esters and glycol ester.

6. A binder according to claim 1 wherein said aqueous dispersion includes also 1 to 5 weight percent, based on the total quantity of the monomers, of a mixture of a solvent selected from the group consisting of methanol and glycols, and a neutral plasticizer selected from the group consisting of dibutyl phthalate, citric acid ester, neutral phosphoric acid esters, and glycolic ester.

7. In a process for the production of an aqueous terpolymer dispersion containing vinyl chloride, ethylene and a vinyl ester having one to 18 carbon atoms in the acid radical, and including terpolymerizing 5 to 25 weight per cent of ethylene, 40 to 82 weight per cent of the vinyl ester and 5 to 40 weight per cent vinyl chloride in presence of a pH buffer to maintain the pH of the dispersion at 3.5 to 7 by the steps of preparing a mixture of water, 2 to 4 weight per cent of water soluble non-ionogenic synthetic protective colloid selected from the group consisting of polyvinyl alcohol, hydroxyethylcellulose, hydroxymethylcellulose and poly-N-vinylpyrrolidone, and a polymerization accelerator, introducing ethylene under pressure to said mixture, and adding said vinyl ester and vinyl chloride at the rate of consumption during the terpolymerization at an increased temperature while maintaining the ethylene pressure between 10 and 100 atmospheres, the improvement which comprises, adding the vinyl chloride and ethylene in a ratio of weight from 1:2 to 3:1 together with 0.5 to 2 weight per cent of a water soluble non-ionogenic emulsifier selected from the group consisting of addition compounds of a member selected from the group consisting of ethylene oxide, ethanolamines and sorbitol with a member selected from the group consisting of fatty acids, tall oil, alkyl phenols, fatty acid amides and fatty alcohols, condensation products of ethylene oxide with nonyl phenol and block polymerizates of ethylene oxide and propylene oxide, said percentages being based on the total quantity of monomers, whereby the dispersion is saponification resistant and exhibits a film formation temperature not higher than 18°C.

8. A process according to claim 7 wherein said vinyl ester is vinyl acetate.

9. A process according to claim 7 wherein said vinyl ester is vinyl propionate.

10. A process according to claim 7, wherein the polymerization is carried out in the presence of 1 to 5 weight percent, based on the total quantity of the monomers, of a solvent selected from the group consisting of methanol and glycols.

11. A process according to claim 7 wherein the polymerization is carried out in the presence of 1 to 5 weight percent, based on the total quantity of the monomers, of a neutral plasticizer selected from the group consisting of dibutyl phthalate, citric acid ester, neutral phosphoric acid esters and glycolic ester.

12. A process according to claim 7 wherein the polymerization is carried out in the presence of 1 to 5 weight percent, based on the total quantity of the monomers, of a mixture of a solvent selected from the group consisting of methanol and glycols, and a neutral plastizier selected from the group consisting of dibutyl phthalate, citric acid ester, neutral phosphoric acid esters and glycolic ester.

* * * * *

UNITED STATES PATENT OFFICE
CERTIFICATE OF CORRECTION

PATENT NO. : 3,816,363
DATED : June 11, 1974
INVENTOR(S) : Paul WICHT et al.

It is certified that error appears in the above-identified patent and that said Letters Patent are hereby corrected as shown below:

On the Title page:

Line [73] Assignee "Lanza Ltd." should be --Lonza Ltd.--

Signed and Sealed this

Twenty-eighth Day of June 1977

[SEAL]

Attest:

RUTH C. MASON
Attesting Officer

C. MARSHALL DANN
Commissioner of Patents and Trademarks